United States Patent [19]

Hayward

[11] 4,020,812

[45] May 3, 1977

[54] FUEL ATOMIZING UNIT

[75] Inventor: Arthur Hayward, Bronx, N.Y.

[73] Assignee: Electronic Fuel Saver, Inc., Bronx, N.Y.

[22] Filed: June 18, 1975

[21] Appl. No.: 587,846

[52] U.S. Cl. .......................... 123/122 F; 123/141; 219/206; 219/207; 48/180 R

[51] Int. Cl.[2] .......................... F02M 31/00

[58] Field of Search .......... 123/133, 122 F, 119 E, 123/141; 219/206, 207; 48/180 R, 180 M; 261/142

[56] References Cited

UNITED STATES PATENTS

| | | | |
|---|---|---|---|
| 1,380,824 | 6/1921 | Mies et al. | 219/206 |
| 1,430,926 | 10/1922 | Schmidt | 219/206 |
| 1,452,883 | 4/1922 | Loesch | 219/206 |
| 1,484,617 | 2/1924 | Aske | 219/206 |
| 1,959,397 | 5/1934 | Turner | 219/207 |
| 2,705,941 | 4/1955 | Urschuld | 123/119 E |
| 2,899,949 | 8/1959 | Hicks | 123/119 E |
| 3,885,539 | 5/1975 | Hicks | 123/119 E |

*Primary Examiner*—Ronald H. Lazarus

[57] ABSTRACT

A fuel atomizing unit interposable in a conduit feeding to a combustion chamber a relatively cold mixture of fuel droplets dispersed in air. The unit is constituted by an electrical heating element placed between a pair of spaced mesh screens to define a permeable assembly having a pocket therein. The assembly functions as a restriction in the conduit whose impedance to flow is in the order of about 15 to 20%, whereby the screen intercepts the droplets to create a suspension in air of minute fuel particles to produce a downstream mist which is forced by the restriction to assume a vortex-like flow pattern. The heat supplied to the pocket by the heater is sufficient to raise the temperature of the mist to a level conductive to complete combustion in the chamber, whereby no fuel is wasted and the exhaust of the chamber is substantially free of pollutants.

13 Claims, 7 Drawing Figures

U.S. Patent  May 3, 1977  Sheet 1 of 4  4,020,812
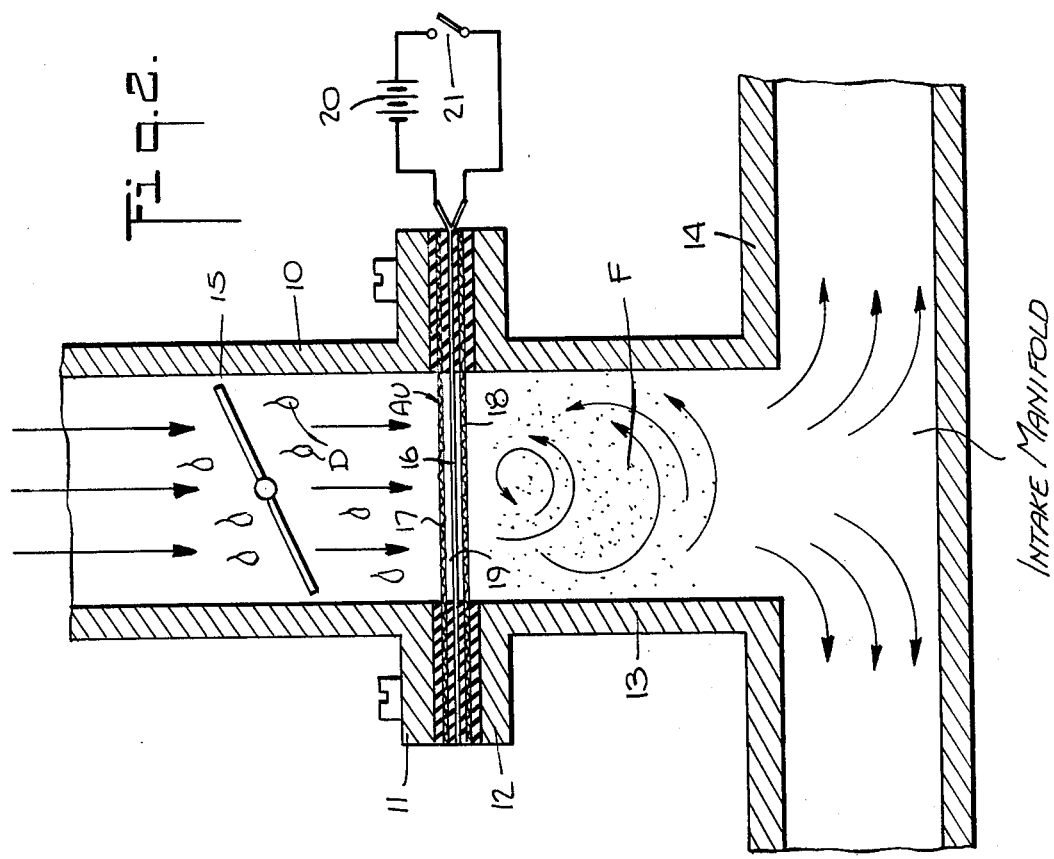
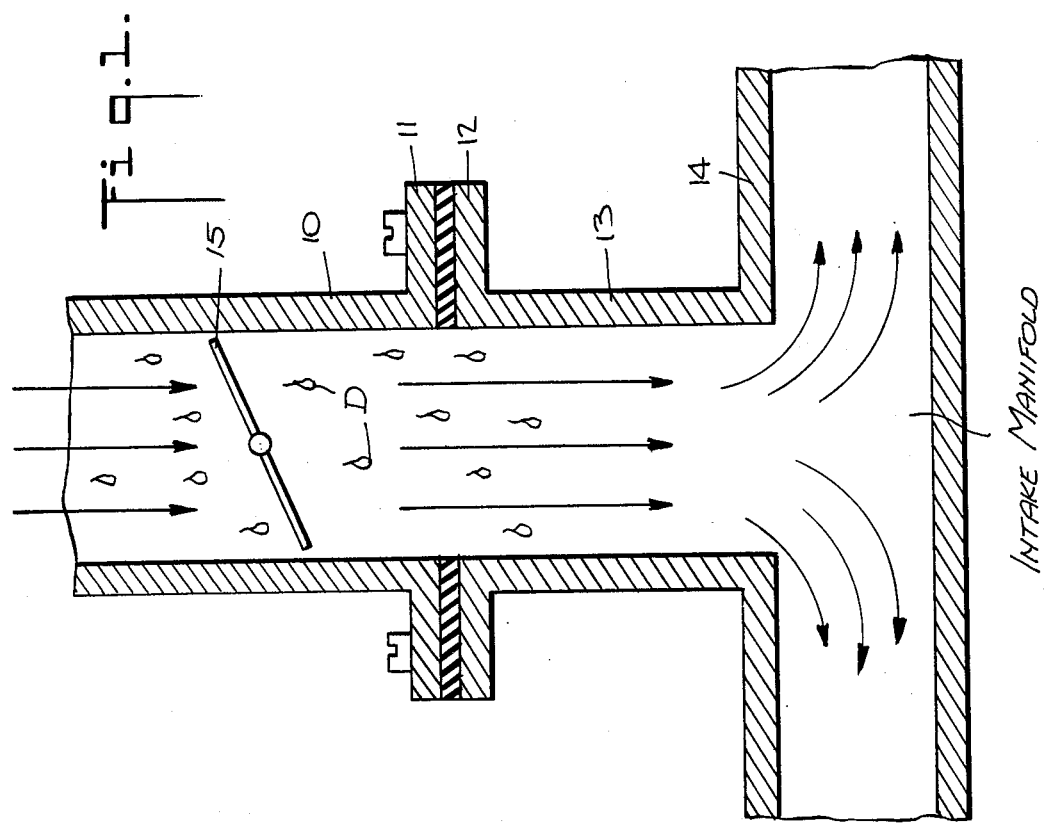

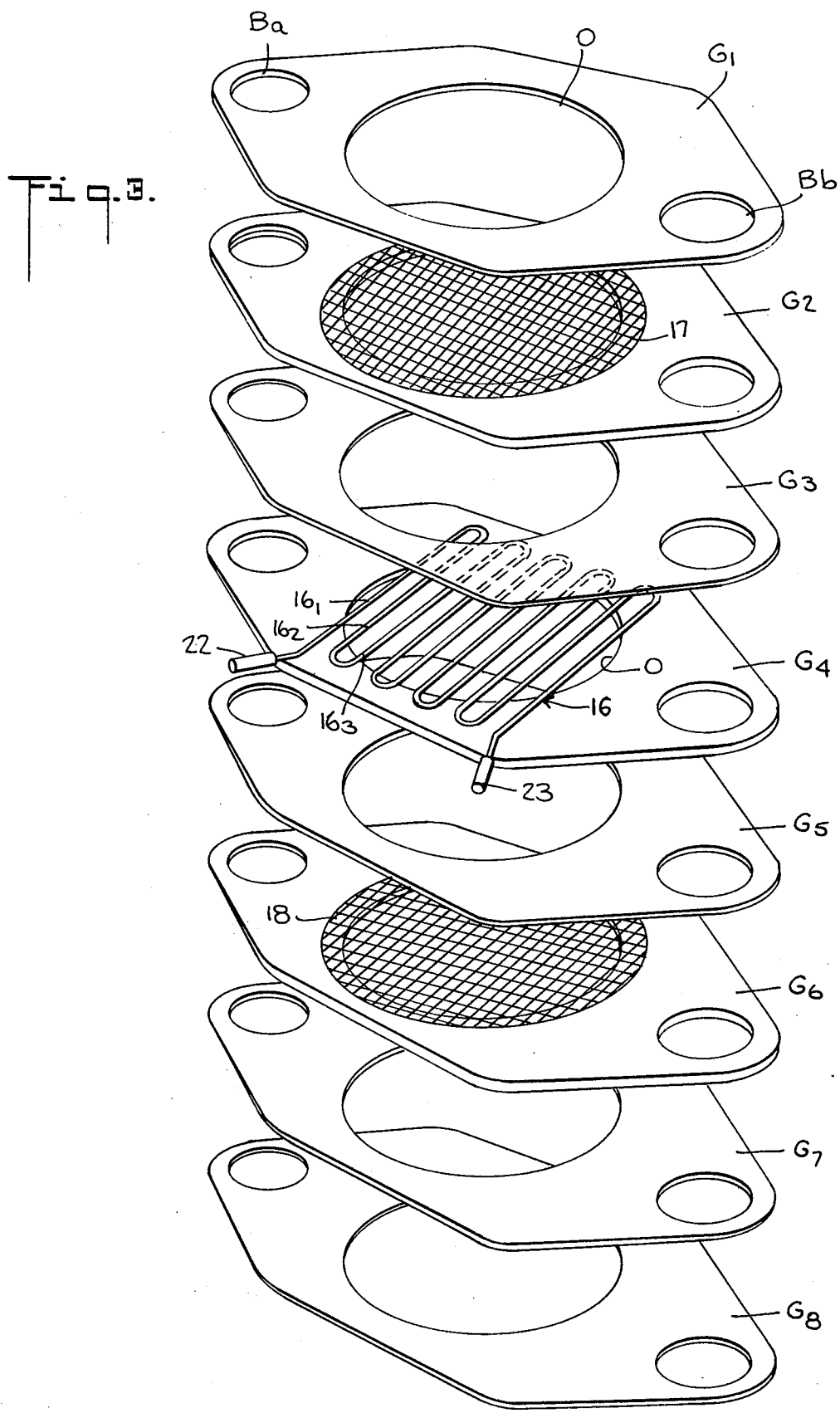

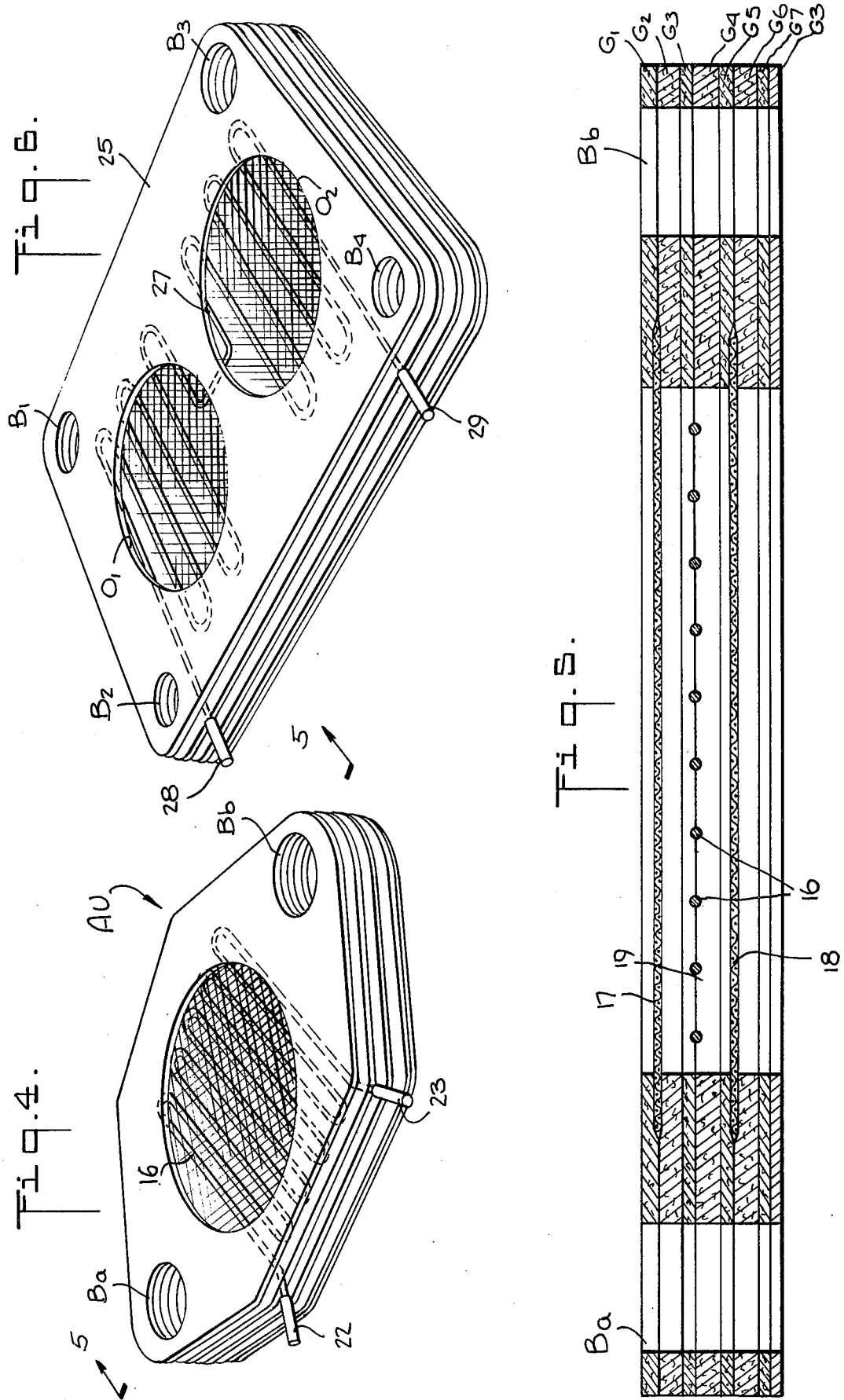

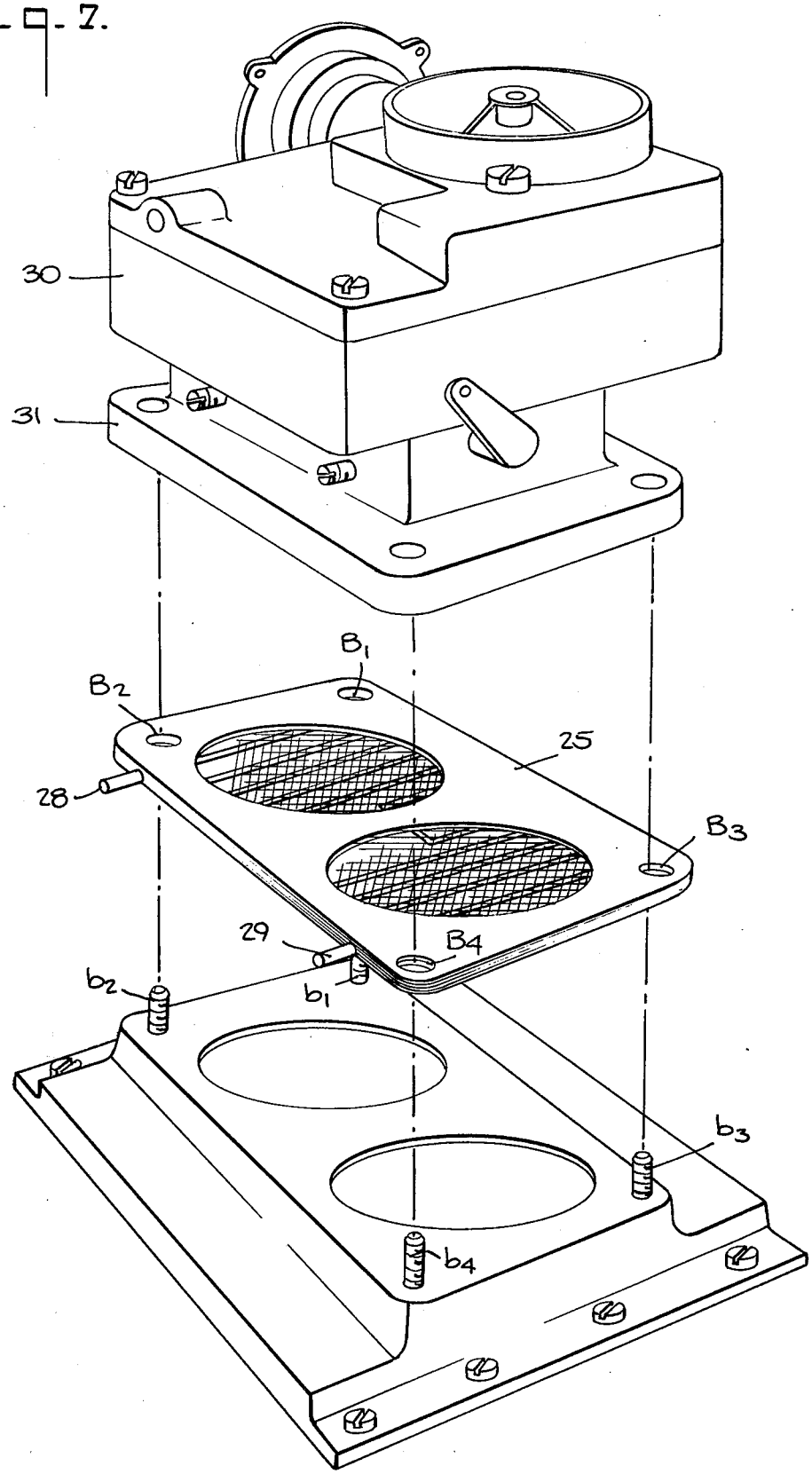

FUEL ATOMIZING UNIT

BACKGROUND OF THE INVENTION

This invention relates generally to apparatus for atomizing fuel supplied to the combustion chamber of an engine or furnace, and more particularly to a fuel-atomizing unit adapted to be interposed between the carburetor and intake manifold of an internal-combustion engine.

The modern era is marked by a growing concern with the inadequate supply of fuel and the rising cost thereof, as well as with the ecological damage resulting from the emission of pollutants from fuel-burning engines and furnaces. Hence while there is a strong international interest in reducing pollutants emanating from automobiles and oil burners, there is at the same time a great desire to effect economies in fuel consumption to conserve the available fuel.

Many expedients heretofore suggested to control pollution have been at the expense of fuel economy. For example, catalytic converters which are designed for installation in the exhaust of a vehicle to cut down the emission of pollutants have an adverse effect of the efficiency of the engine and cause the engine to burn more gasoline. Thus whatever is gained in ecological terms is contradicted by significant economic losses.

In an internal-combustion engine, the pollutants are constituted by oxides of nitrogen, unburned hydrocarbons and carbon monoxide. But it is not only the emission from the engine exhaust into the atmosphere which creates an ecological problem, for the emitted substances give rise to chemical reactions in the atmosphere when radiant energy is supplied thereto by the sun. Thus the smog now encountered in many major cities is largely the result of photochemical reactions involving unburned hydrocarbons from automobile exhausts. These unburned hydrocarbons are also responsible for inefficient engine operation, in that carbon deposits are formed on the walls of combustion chambers.

Thus with existing internal-combustion engines, a measurable portion of the fuel supplied thereto remains unburned and is discharged. This not only results in an uneconomical engine operation, but it also contaminates the atmosphere.

Attempts have heretofore been made to interpose an atomizer between the carburetor and the intake of the engine to insure complete combustion of the fuel. For example, U.S. Pat. No. 3,544,290 discloses a unit in the form of a strainer for the fuel-air mixture operating in conjunction with a vibrator to agitate the mixture in order to effect atomization thereof. Similar attempts to homogenize the air-gas mixture are disclosed in U.S. Pat. Nos. 1,260,699 and 1,035,614. But in all instances, the arrangements disclosed in the prior art possess certain practical drawbacks which have militated against their general commercial acceptance.

SUMMARY OF INVENTION

In view of the foregoing, it is the main object of this invention to provide an improved fuel atomizing unit serving to homogenize and heat the fuel mixture fed into the combustion chamber of an engine or burner so that complete combustion thereof takes place, thereby making maximum use of the available fuel and minimizing the emission of unburned fuel constituents.

More particularly, it is an object of this invention to provide an atomizing unit which is of simple, low-cost and durable design, which unit is adapted to be interposed between the mounting flange of a carburetor and the complementary flange of an intake manifold, whereby the unit may be quickly installed and replaced when necessary without difficulty.

Also an object of this invention is to provide a unit of the above-noted type which incorporates a heater energized by the battery of the vehicle in which the unit is installed, the heater serving to elevate the temperature of the fuel-air mixture passing therethrough to a desired level conducive to vaporization. The heater is of low wattage, so that little current is drawn and the load imposed on the battery is insignificant.

Still another object of this invention is to provide an atomizing unit which functions reliably and efficiently to convert a relatively cold fuel-air mixture in which droplets of fuel are dispersed in air into a heated fog in which minute particles of fuel are suspended in air, whereby admitted into the combustion chamber of the engine or furnace is a highly inflammable gas devoid of droplets, thereby promoting complete combustion and obviating the waste of fuel.

A significant advantage of the invention as applied to an automobile engine, apart from providing a significant increase in gas mileage and lowering the emission of pollutants, is the improvement in start-up characteristics, for the invention makes possible a rapid start-up even under extremely cold conditions. While the invention will be described herein in conjunction with automobile engines, it will be recognized that it is equally applicable to marine and aircraft internal-combustion engines as well as to furnaces and other devices having combustion chambers which are fueled by kerosene, gasoline, or any other hydrocarbon intermixed with air.

Briefly stated, these objects are attained in an atomizing unit adapted to be interposed in a conduit feeding a relatively cold mixture of fuel droplets dispersed in an airstream to a combustion chamber for ignition therein.

The unit is constituted by an electrical heating element placed between a pair of spaced mesh screens to define a permeable assembly having a pocket therein. The assembly functions as a restriction in the conduit whose impedance to flow is in the order of about 15 to 20%, whereby the screens intercept and atomize the droplets, creating a suspension of minute fuel particles in air to produce a downstream mist or fog which is forced by the restriction to assume a vortex-like flow pattern. The heat supplied to the pocket by the heater is sufficient to raise the temperature of the fog in the output of the unit to a level conducive to complete combustion when the fog reaches the chamber, thereby minimizing fuel waste and the emission of pollutants.

OUTLINE OF DRAWINGS

For a better understanding of the invention as well as other objects and further features thereof, reference is made to the following detailed description to be read in conjunction with the accompanying drawings, wherein:

FIG. 1 is a schematic sectional illustration of a carburetor coupled in a conventional manner to the intake manifold of an internal-combustion engine;

FIG. 2 is the same as FIG. 1, save that an atomizer unit is accordance with the invention is interposed between the carburetor and the intake manifold;

FIG. 3 is an exploded view of one preferred embodiment of an actual atomizing unit of the single assembly type in accordance with the invention;

FIG. 4 is a perspective view of the actual unit;

FIG. 5 is a section taken through the single assembly unit in the plane indicated by line 5—5 in FIG. 4;

FIG. 6 is a perspective view of a dual assembly atomizing unit in accordance with the invention;

FIG. 7 is an exploded view illustrating the manner in which the dual assembly unit is interposed between a standard carburetor and a dual input intake manifold.

DESCRIPTION OF INVENTION

Background

Referring now to FIG. 1, for purposes of background there is schematically illustrated the arrangement found in a conventional internal-combustion engine having a standard carburetor serving to generate the fuel-air mixture needed to power the engine. Only the throat 10 of the carburetor is shown, the throat having a mounting flange 11 which is directly bolted to a complementary flange 12 on the inlet pipe 13 of an intake manifold 14 leading to the cylinders of combustion chambers of the engine.

In the carburetor, hydrocarbon fuel or gasoline is dispersed as tiny droplets D in a stream of air. As a result of heat absorption on the way to the cylinders, these droplets are vaporized, so that the mixture then becomes an inflammable gas. The vapor-air mixture thus formed enters the combustion chambers of the cylinders where it is ignited to produce explosive forces for driving the pistons. A throttle valve 15 is disposed within the throat of the carburetor, this valve being operated by the accelerator pedal.

One reason a conventional carburetor system in an internal-combustion engine is wasteful of fuel is that the efficiency of mixing depends on atomizing the fuel into minute particles. But with a standard carburetor, many of the particles or droplets of the fuel are relatively coarse, thereby avoiding adequate contact with the air so that the droplets go through the engine unburned. Another reason why a significant portion of the fuel supplied to the engine is dissipated is that the mixture yielded by the carburetor is quite cold, and while it is heated in the course of its passage to the combustion chambers by heat absorption, the fuel is not always fully vaporized. Indeed, the mouth of a carburetor at the intake manifold is generally quite cold, so that in an aircraft internal combustion engine ice is often formed in this region.

General Description

An atomizing unit in accordance with the present invention is shown in FIG. 2 and is generally designated as unit AU. The unit is dimensioned and flanged so that it may be interposed between flanges 11 and 12 and thereby inserted in the conduit conducting the fuel-air mixture to the cylinders. The unit is constituted by an electrical heater element in the form of a resistance wire 16 placed between a pair of spaced mesh screens 17 and 18 to define an assembly having a pocket 19 therein. The assembly functions as an obstacle or restriction in the flow path. The restriction preferably has an impedance to flow which is in the order of 15% to 20%.

The droplets D in the mixture passing through the assembly are intercepted by the screen meshes of the assembly and are dissected thereby to form minute fuel particles which are suspended in the airstream to produce a downstream mist or fog F.

It is well-known that under certain circumstances the introduction of a restriction in a flow conduit may change the character of the flow and influence the downstream flow pattern. Thus while in the absence of the restriction of air flow pattern is essentially laminar, the presence of the restriction results in downstream turbulence to create vortices.

The reason the downstream vortices produced by the atomizing unit is beneficial is that these vortices effectively prolong the path between the carburetor and the combustion chambers in the cylinders and thereby lengthen the period during which heat is absorbed to volatilize the fuel.

Moreover, the cold mixture issuing from the carburetor is heated in pocket 19 by heater 16, which is connected to the battery 20 of the vehicle, so that when the ignition switch 21 of the vehicle is turned on, the heater is immediately energized. Thus the pocket is heated before fuel is supplied to the carburetor and there is no warm-up period for the unit in that its pocket is already heated by the time a cold mixture is applied thereto. Because the unit makes it possible to fully exploit the fuel fed into the engine, the formation of carbon deposits in the cylinders with continued use is minimized and one not only gains an improvement in fuel efficiency but also in engine performance. The heater is adapted to elevate the temperature of fog F to a level conducive to the full volatilization thereof by the time the fog enters the combustion chamber. In other words, instead of solely relying on heat obtained by absorption in the course of passage to the combustion chamber, the cold mixture is heated before entering the passage, thereby producing a warm fog and promoting full volatilization thereof.

It will be appreciated that a unit operating on the same principles may be constructed so that it can be interposed in the conduit of an oil-burning domestic or industrial furnace or any other device in which a fuel is mixed with air and is atomized and heated by the unit to provide an inflammable gas which is ignited in a combustion chamber. Consequently, the unit is also useful in reducing atmospheric pollution as a result of oil burner operations.

First Embodiment

Referring now to FIGS. 3, 4 and 5, there is shown a single assembly unit in accordance with the invention. This unit is formed by a stack of gaskets $G_1$ to $G_8$, which are all of the same shape and are laminated together by a suitable heat and chemical-resistant bonding agent, such as an adhesive of the epoxy family. In addition, the gaskets may be stapled together to prevent delamination thereof.

Each gasket is provided with a pair of flanges having bores $B_a$ and $B_b$ therein at diametrically-opposed positions with respect to a large circular opening 0 serving as the passage for the fuel-air mixture. The dimensions of the unit are such as to register with the flanges 11 and 12 of the carburetor throat and manifold intake pipe. Thus the unit may be interposed between these flanges, with the flange bolts passing through bores $B_a$ and $B_b$, thereby clamping the unit between the carburetor throat and the intake manifold.

All of the gaskets, except for gasket $G_8$, are formed of a heat-resistant insulating material which is non-reactive with the fuel-air mixture passing through the unit, the preferred material being an asbestos composition. Alternatively, gaskets $G_1$ to $G_7$ may be made of fiberglass or other suitable material. Gasket $G_8$ at the bottom of the stack is stamped out from a metal sheet, such as copper or aluminum, having high thermal conductivity. Gasket $G_8$, which is disposed on the hot side of the unit, functions as a heat sink to prevent excessive heating thereof.

Gaskets $G_1$, $G_3$, $G_5$ and $G_7$, which serve as insulating spacers, are relatively thin and are all of identical thickness (i.e., 15 mils), while gaskets $G_2$ and $G_6$, which act to support screen 17 and 18, as well as gasket $G_4$ for supporting heater element 16, are of greater thickness (i.e., 30 mils).

Screens 17 and 18, which cover the central openings 0 of gaskets $G_2$ and $G_6$, are formed by wire meshes or grids, preferably woven of stainless steel wire. Other non-reactive metals of high thermal conductivity, such as titanium wire, may be used in fabricating the screen. The two meshes are identical and preferably have a mesh size of about 20 to 24 holes per line inch in order to introduce a desired restriction to flow whose impedance is approximately 15 to 20%.

Heater element 16, which overlies the opening of gasket $G_4$, is formed of a resistance filament, such as Nichrome wire (a nickel-chromium alloy), which is sinuously-shaped to define across opening 0 a planar array of parallel wire section $16_1$, $16_2$, $16_3$, etc. The warp and woof wires of the two screens 17 and 18 are aligned with each other so that the interstices thereof form holes which are in alignment.

Terminals 22 and 23 are connected to the end of the heater wire and project laterally from the unit for connection to the battery 20. The heater wire is protectively ensheathed and electrically insulated by an inorganic ceramic coating of high thermal conductivity, such as "Sermatel" composition. This coating may be applied to the wire by a spray or dip technique. The gauge of the heater wire is preferably 25 mils.

The resistance of the heater element is such that with 14.5 volts applied thereto, it draws a current of 3 amperes so that its wattage is 43.5. The heater is designed to heat pocket 19 created by the narrow space between the upper and lower screens to a temperature of about 550° to 650° F. in the unloaded state; that is, in free air at ambient temperature without a cold gas-air mixture passing through the unit.

As pointed out previously, the gas-air mixture generated by the carburetor is forced through pocket 19, which is adapted to restrict flow therethrough with an impedance of about 15 to 20%. Because the temperature of this mixture at the input side of the unit is close to 0° F., the transfer of heat to this mixture in the course of its restricted flow through the pocket greatly reduces the pocket temperature.

We have found that for the unit to be effective, the heat supplied to the cold mixture must be sufficient to raise its temperature to a level falling within a broad range of about 90° to 220° F. Moreover, we have found that a heater arrangement producing a pocket temperature in the loaded state in the narrow range of about 150° to 180° constitutes the optimum working conditions for developing a warm fog at the output side of the unit. The wires which intercept the fuel droplets in the mixture act to dissect and atomize these droplets to create the desired fine mist or cloud.

Thus in lieu of a cold mixture of relatively coarse gasoline droplets in the air streaming into the intake manifold of the engine, the unit functions to feed therein a warm fog in which minute fuel particles are suspended in air in a vortex-like pattern. This is highly conducive to the total vaporization of the fuel entering the combustion chamber and its full ignition therein.

Because of the low wattage of the heater, the current drawn from the battery is not much greater than that of a car light so that in practical terms the load imposed by the unit on the battery is insignificant. And because the fuel is raised by the unit to a temperature well below its ignition point, there is no danger of explosion outside of the combustion chamber.

Tests

The following road tests were performed on various models of standard automobiles, all running at 60 miles per hour, to determine the miles-per-gallon (MPG) normally obtained in the absence of the atomized unit as compared to the MPG realized with the unit installed and operating the vehicle:

| Vehicle | M.P.G. without Unit | M.P.G. with Unit |
|---|---|---|
| 1970 Mercury (390 Engine) | 13.3 | 20.8 |
| 1972 Plymouth (225 Engine) | 16.9 | 26.7 |
| 1974 Plymouth (225 Engine) | 20.5 | 27.8 |
| 1971 Pontiac Grand Prix | 12.5 | 18.9 |
| 1974 Ford (351 Engine) | 11.8 | 18.8 |
| 1971 Buick (225 Engine) | 14.4 | 19.1 |
| 1973 Thunderbird | 12.2 | 18.8 |
| 1967 Olds Supreme | 13.1 | 19.2 |

It will be evident from the foregoing that with the unit installed, a major improvement in fuel economy was obtained in each vehicle tested. Emission tests carried out on vehicles with and without the unit were similarly impressive. Various vehicles were tested without the unit (BLR = Base Line Run), and then with the unit installed (TUR = Test Unit Run). The following results are typical of those obtained with respect to the emission of hydrocarbon (HC) and carbon monoxide:

| | | HC | CO |
|---|---|---|---|
| 1. | (BLR at 1250 RPM | 71 ppm | .60% |
| | (TUR at 1250 RPM | 21 ppm | .10% |
| 2. | (BLR at 2500 RPM | 25 ppm | .15% |
| | (TUR at 2500 RPM | 15 ppm | .10% |
| 3. | (BLR at 750 RPM | 150 ppm | 3.4% |
| | (TUR at 750 RPM | 90 ppm | .31% |
| 4. | (BLR at 1250 RPM | 25 ppm | .15% |
| | (TUR at 1250 RPM | 15 ppm | .10% |
| 5. | (BLR at 750 RPM | 150 ppm | 3.4% |
| | (TUR at 750 RPM | 90 ppm | .31% |

Thus in each of the above five comparative tests, the emission of noxious contaminants was significantly reduced by the unit. It is evident, therefore, that the unit acts to strikingly improve the fuel efficiency of the engine while at the same time reducing the emission of pollutants.

Second Embodiment

The construction of a dual assembly atomizer unit as shown in FIGS. 6 and 7 is essentially the same as the single assembly unit previously described, except that the stack 25 of gaskets which are laminated together, which stack includes a metal heat sink gasket at the bottom, have a rectangular formation, and instead of a single circular central opening in each gasket, a pair of circular openings $O_1$ and $O_2$ are provided.

Bores $B_1$, $B_2$, $B_3$ and $B_4$ are provided at the corners of the gaskets to accommodate the bolts $b_1$, $b_2$, $b_3$ and $b_4$ projecting above the intake manifold 26. The dual assembly unit further includes a pair of spaced screens and a heater element placed therebetween, similar to those in the single assembly unit. Each screen and heater element assembly cooperates with respective openings $O_1$ and $O_2$ to define a distinct pocket to restrict the passage therethrough with a flow impedance of about 15 to 20%.

Heater element 27 is in twin form, one for each flow passage, and it is provided with terminals 28 and 29 which project from the unit for connection to the car battery.

In installing the unit, one simply places it over intake manifold 26 before mounting the carburetor 30 thereover. The carburetor has a flange 31 whose rectangular formation matches that of the intake manifold and is provided with corner bores to receive the mounting bolts. The carburetor is secured in place by nuts threadably received on the bolts, thereby clamping the atomizer unit between the carburetor and the intake manifold.

The operation of this dual assembly unit is identical to that of the single assembly unit and functions to convert the cold gas-air mixture generated by the carburetor into a warm fog having a vortex-like pattern conducive to total vaporization and full ignition in the engine combustion chambers.

While there have been shown and described preferred embodiments of fuel atomizing units, it will be appreciated that many changes and modifications may be made therein without, however, departing from the essential spirit of the invention.

I claim:

1. An atomizing unit interposable in a conduit feeding a relatively cold mixture of fuel droplets dispersed in an air stream to a combustion chamber for ignition therein, said unit comprising:
   A. a pair of parallel mesh screens having an electrical heating element placed in space therebetween to define a pocket which restricts the flow of said mixture through said pocket, the restriction having an impedance to flow in the range of about 15 to 20 percent, said screens intercepting said droplets in said mixture and dissecting said droplets to develop in the output of said unit a fog-like suspension of minute particles in air; and
   B. means to energize said heating element to heat said pocket to a temperature level which in free air exceeds about 500° Fahrenheit and in the presence of said mixture causes said fog to attain in said output a temperature level lying above about 90° Fahrenheit to promote vaporization thereof before it enters said combustion chamber, said unit being interposed between a carburetor to produce said cold mixture and an intake manifold leading to the cylinders of an internal combustion engine having a battery and an ignition switch, said means to energize said heating element connecting said battery to said heating element through said switch whereby said pocket proceeds to heat up in free air as soon as said switch is closed and before the cold mixture produced by the carburetor is fed through said unit into said intake manifold, thereby promoting a rapid start-up of said engine, said unit further including a heat sink to prevent excessive heating thereof said screens and said heater element being held at spaced positions within a stack of electrically-insulating, heat-resistant gaskets having an opening therein for the passage of said mixture, said stack further including a bottom gasket formed of metal to act as said heat sink.

2. A unit as set forth in claim 1, wherein said mesh screens are woven of stainless steel wire.

3. A unit as set forth in claim 2, wherein said screens have a mesh size of about twenty holes per inch.

4. A unit as set forth in claim 1, wherein said heater element is formed by a sinuously-shaped resistance wire defining an array of parallel sections in a plane perpendicular to the direction of flow.

5. A unit as set forth in claim 1, wherein said screens and said heater element which are held at spaced positions within a stack of electrically-insulating, heat-resistant gaskets are laminated together by a heat-resistant bonding agent which is chemically non-reactive to the mixture, said gaskets having an opening therein for the passage of said mixture.

6. A unit as set forth in claim 5, wherein said gaskets are provided with bores to receive bolts passing through the flanges of a carburetor and an intake manifold.

7. A unit as set forth in claim 5, wherein said gaskets are provided with twin openings, each cooperating with a set of screens and a heater to form a dual atomizer unit.

8. A unit as set forth in claim 5, wherein said gaskets are formed of asbestos.

9. A unit as set forth in claim 8, wherein said bottom gasket is formed of aluminum.

10. A unit as set forth in claim 8, wherein said bottom gasket is formed of copper.

11. A unit as set forth in claim 1, wherein said heating element is adapted when energized to raise the free air temperature of said pocket to a level in the range of about 530 to 650 degrees Fahrenheit.

12. A unit as set forth in claim 1, wherein the wattage of said unit is such as to draw less than 5 amperes of current from said battery.

13. A unit as set forth in claim 1, wherein the heat supplied by said heater element to said pocket raises the temperature level of fog in the output of the unit to a point in the range of about 150° to 180° Fahrenheit.

* * * * *

UNITED STATES PATENT OFFICE
CERTIFICATE OF CORRECTION

Patent No. 4,020,812             Dated   May 3, 1977

Inventor(s)  Arthur Hayward

It is certified that error appears in the above-identified patent and that said Letters Patent are hereby corrected as shown below:

Abstract, line 14 change "conductive" to -- conducive --

Column 1, line 24 change "of" (second occurrence) to -- on --

Column 2, line 67, change "is" (first occurrence) to -- in --

Column 4, line 8 change "of" to -- the --

Signed and Sealed this ninth Day of August 1977

[SEAL]

Attest:

RUTH C. MASON
Attesting Officer

C. MARSHALL DANN
Commissioner of Patents and Trademarks